June 10, 1969 R. J. McCALL 3,448,549

METHOD OF GENERATING A LENS

Filed April 6, 1967

INVENTOR.
RICHARD J. McCALL
BY
CAROTHERS & CAROTHERS
HIS ATTORNEYS

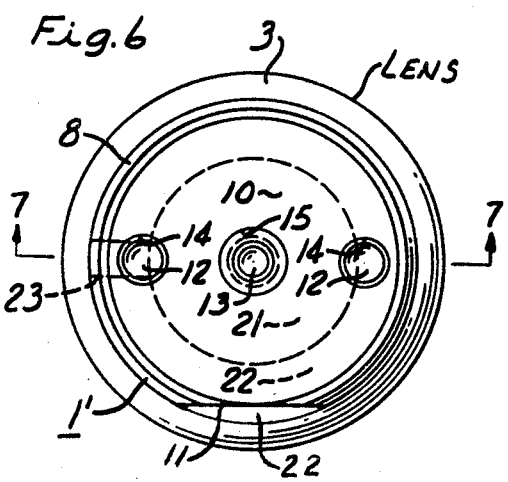
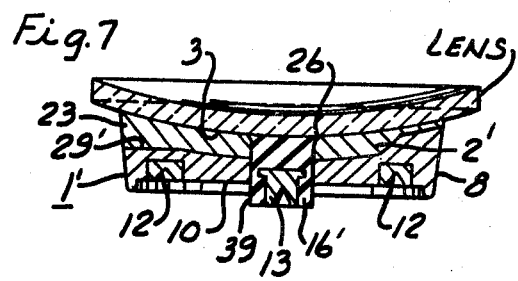
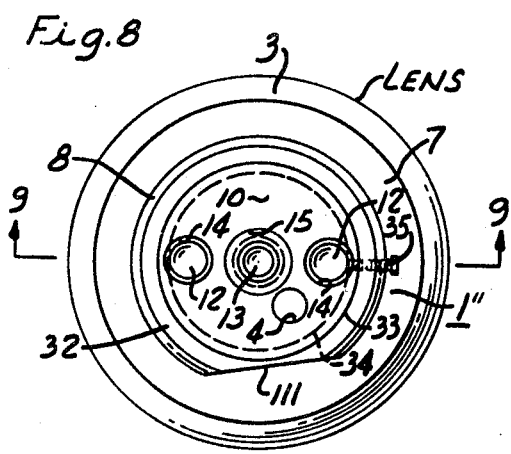
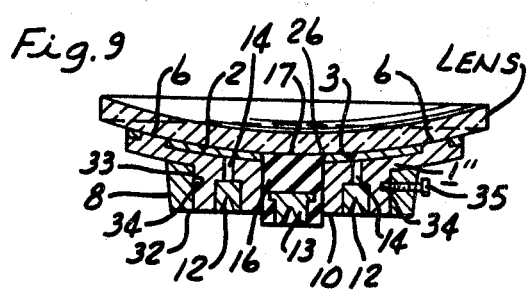

United States Patent Office 3,448,549
Patented June 10, 1969

---

3,448,549
METHOD OF GENERATING A LENS
Richard J. McCall, Summer Hill, Pa., assignor, by mesne assignments, to Shuron/Continental Division of Textron Inc., Rochester, N.Y., and Providence, R.I., a corporation of Rhode Island
Filed Apr. 6, 1967, Ser. No. 628,970
Int. Cl. B24b 9/14, 41/06
U.S. Cl. 51—284                                    4 Claims

ABSTRACT OF THE DISCLOSURE

The method of applying a low melting point lens block to cover a lens surface and leaving a window closed by a removable shield plug that seals the ocular vertex lens surface area defined by the window against abrasives when generating and finishing the opposite face of the lens and supporting the low melting point lens block during the process by a permanent material lens block.

CROSS REFERENCE

Applicant's copending application Ser. No. 599,591, filed Dec. 6, 1966.

BACKGROUND OF THE INVENTION

Field of invention

A lens is usually finished on one face or side, and the other face or side must be ground and polished to prescription. If neither face or side of the lens is finished, then one side is blocked and the other side is finished after which the finished side is blocked and the opposite side is finished. Ordinarily, one side of the lens is convex and the opposite side is concave. This is not necessarily always true. Usually the convex surface is finished first or purchased in its finished state, and the concave surface is ground and polished to the patient's prescription.

Description of prior art

When only a lens block of low melting point material is used in the process, the problems are simplified in that this block provides the reference and the support.

Some processes require a hard or permanent metal lens block. These permanent metal lens blocks may be positioned over the lens providing a very small cavity therebetween, which when properly oriented and filled with a hot low melting point fluid and solidifier, the material actually attaches the lens to the oriented permanent metal block. The lens is then ground and finished being at all times held or supported by the oriented permanent metal lens block.

Another process requires the application of a low melting point material to one surface of the lens, which is pre-coated with a protective coating such as a sprayed-on plastic, to form a thin lens block having an oriented index or reference lug thereon providing a means of locating the cylinder axis of the lens. A hard metal block is mounted over this thin block and is properly oriented thereon by the reference key or orienting lug, which has a mating surface on the hard metal block when the lens is supported for spherical and cylindrical generation. The blocks may be stuck together with an adhesive or merely held together by the forces of generation.

The permanent metal block in the last process may have a central opening in which is inserted a rubber stopper having a central bearing unit to be engaged by a single pin to support the mounted lens when subjected to a rotary vibratory motion to spherically grind and polish the lens. The rubber stopper is even stopped short of engaging the surface of the low melting point material.

SUMMARY OF INVENTION

In no instance do any of these former processes provide a window in the low melting point material or the permanent metal block used therewith to check the prescription of the lens before the lens is removed from the low melting point material.

The use of the window is important for glass lenses since they may be made within closer tolerances, and where plastic lenses are concerned, it is difficult to accurately grind and polish the lens without checking the prescription through windows not only in the low melting point material, but also in the permanent metal lens block without removing the same. This invention provides windows permitting such checking. Thus every correction can be made in the grinding and polishing steps to provide an accurate lens without loss. If these plastic lenses were to require remounting in the low melting point blocking metal after they have been ground or partially ground, they would become distorted and the time lost would be materially greater than the cost that could be afforded.

Thus it is an important and a material improvement to be enabled to check the prescription of the lens before removing it from the permanent metal lens block and particularly so with plastic lenses.

The principal object of the invention is the provision of method to carry out this invention.

Another object is the provision of a method to check the ocular vertex of a lens during generation, rough polishing, finish polishing, and after completion but before the lens block is removed, to permit correction of the process step and a final check to determine if it is accurately on power before removal of the low melting blocking material.

Another object of the present invention is to provide a method of sealing the window during generation of the lens and to also provide a bearing point in the outer face of the seal or plug for the spherical generation of the lens.

Other objects and advantages of this invention appear hereinafter in the following description and claims.

The drawings show, for the purpose of exemplification without limiting the invention or the claims thereto, certain practical embodiments illustrating the principles of the present invention wherein:

FIG. 6 is a bottom plan view of a lens mounted on a hard metal block for rough and finish polishing a cylinder and a spherical surface on the lens.

FIG. 7 is a sectional view taken on the line 7—7 of FIG. 6.

FIG. 8 is a bottom plan view illustrating a structural variation of the hard metal lens block shown in FIG. 1.

FIG. 9 is a sectional view taken along the line 9—9 of FIG. 8.

Figure 1:
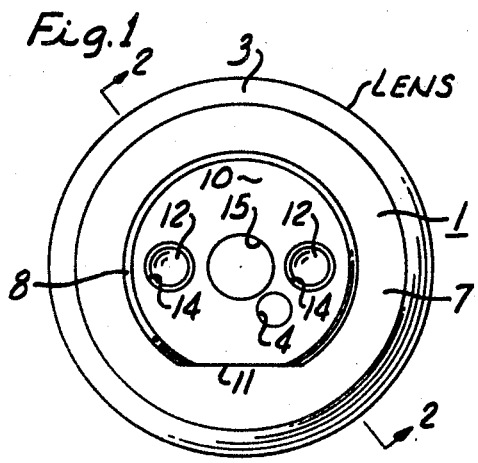
FIG. 1 is a bottom plan view of a hard metal block mounted on a lens.
Figure 2:
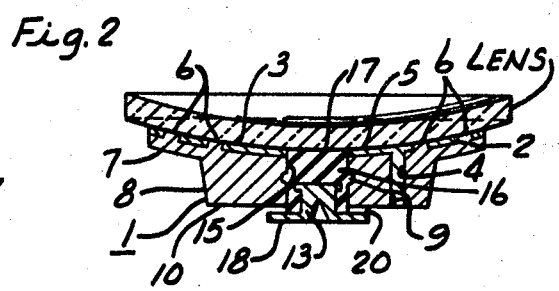
FIG. 2 is a sectional view taken on the line 2—2 of FIG. 1.
Figure 4:
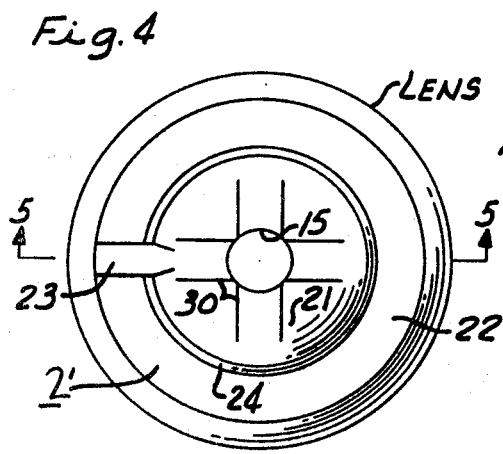
FIG. 4 is a bottom plan view of a block of low melting point material on a lens.
Figure 3:
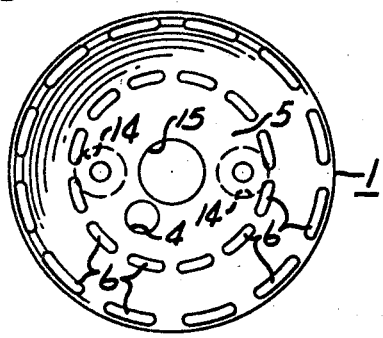
FIG. 3 is a plan view of the lens face of the hard metal block.

Referring to FIGS. 1, 2 and 3 of the drawings, the hard metal lens block 1 is secured to the lens by means of an adhesive so that the lens may be chucked in the grinding and polishing machines. The adhesive may consist of a molten low melting-point pitch, resin or alloy as illustrated at 2. This alloy for example may be a mixture of bismuth, lead, tin, indium and cadmium which has a melting point of about 136 degrees F. The lens may be first coated with a protective finish such as with a sprayed plastic or a tape to prevent the convex finished surface 3 of the lens blank from becoming scored or otherwise damaged and to provide better adherence of the low melting-point material to the lens blank surface 3.

The block 1 is oriented relative to the lens to provide the proper adjustments for axis in order for the lens to have the ophthalmic properties desired and the molten low melting-point material is then introduced therebetween by way of the mold entrance or fill passage 4 through the block 1. The molten material fills the cavity between the surface 3 of the lens and the upper face 5 of the block as indicated at 2, where it solidifies and fixes the hard metal block 1 to the lens with the proper axis adjustment. The upper face 5 of the block is provided with the projections 6 to permit evacuation of air pockets and facilitate adhesion of the block with the pitch or low-melting alloy.

The lens block 1 is provided with the head portion 7 having a frusto-conical shank portion 8 projecting therefrom and terminating in a circular flat surface 10 that is normal to the axis of the lens block 1. The block 1 is provided with flat gauge surface 11 which is parallel to the axis of cylindrical generation or the line of the three recesses 12 and 13 to provide a reference point so that the cylindrical axis of the lens is known at all times while the lens is blocked. This flat 11 thus permits the cylindrical axis of generation to be automatically located on a vertometer and permits a rough check of the lens prism while the lens block is still on the lens.

The face 10 of the block is provided with an aligned series of three recesses. The two recesses or bearings 12 are adapted to accommodate two driving pins of the spindle or arbor of a generating or cylinder surfacing machine; and recess or bearing 13, as shown in FIG. 2, is adapted to receive the driving pin of a sphere surfacer when a spherical surface is to be ground on the blocked lens. The bearing recesses 12 are formed of metal inserts somewhat harder than that of the hard metal block 1, such as steel or brass, to provide a good bearing surface. These inserts are pressed into the openings 14 wherein they are rigidly sealed and fixed. Access to the under side of the inserts 12 is provided from the surface 5 to permit their removal and replacement.

The block 1 has a central hole or opening 15 therethrough to receive the shield plug 16 and provide a window when the block is mounted to the lens. The shield plug 161 is preferably of a somewhat elastomer material such as rubber or a plastic to provide a good seal when the plug is inserted in the opening 15. The shield plug 16 or one similar thereto is inserted in the opening 15 such that it extends beyond the surface 5 of the block and engages the convex surface 3 of the lens to seal off the ocular vertex surface area of the lens before the low melting-point material 2 is poured into the cavity between the block and lens. The end 17 of the plug is preferably concave to ensure that the ocular vertex area of the lens is well sealed from the molten adhesive. Thus the block 1 is properly adjusted in relation to the lens for prism and axis and the ocular vertex area is sealed off before the molten material is introduced through passage 4. When the molten material has solidified, the shield plug 16 may be removed to provide a window on the ocular vertex area of the lens through the block 1 and low-melting point material 2.

The shield plug has a hard metal head 18 which is vulcanized or otherwise secured to the plug, as by molding irregular projections of the head 18 within the plug or by glueing, and which provides the bearing recess 13 for spherical generation or polishing and a means to grip and remove the shield plug. It is preferable that a small clearance 20 be provided between the head 18 and the block surface 10 to take advantage of the shock absorbing properties of the shield plug 16 during spherical grinding operations when the grinding forces are transmitted to the bearing recess 13.

The lens may then be generated to prescription with the shield plug 16 inserted to seal the ocular vertex area on the finished surface 3 of the lens thereby protecting it from being damaged by abrasives during the operation of generating and polishing the lens. During any period of generation or polishing, the block mounted lens may be removed from the grinding machinery and the plug 16 removed to permit the power and the prism to be checked for accuracy and the lens may be reground and polished, if necessary, after the shield plug is replaced, and without disturbing the original lens block. This not only saves time in the process of generating and polishing the lenses but permits one to very accurately reproduce the prescription with the use of only one lens block application. This also prevents waste caused from an overgeneration of the lens which cannot be corrected thereby rendering the lens useless. This is particularly true with plastic lenses which due to their unpredictable properties make it extremely difficult to generate an accurate prescription without the means of the present invention to periodically check the lens prescription with a vertometer before dismantling the lens block 1 and the material 2.

The hard metal block 1 has a ring groove in the wall of the opening 15 to provide an interlock 9 with the corresponding annular projection on the shield plug 16. This interlock prevents accidental removal of the shield plug.

Figure 5:
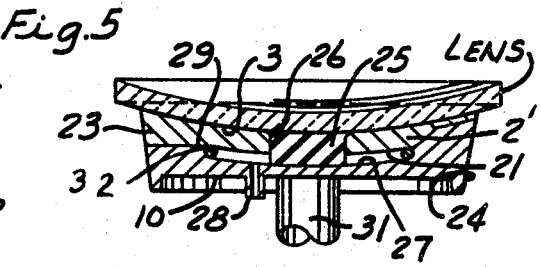
FIG. 5 is a sectional view of the structure of FIG. 4 held by low pressure air on a mandrel for generating the lens.

Referring to FIGS. 4, 5, 6 and 7, the lens is mounted by the low melting-point material 2' which forms a thin molded lens block in itself. This thin block may be molded thereon by a machine similar to the type illustrated in U.S. Patent 3,049,766. The low melting-point alloy is molded to provide the smooth dome-shaped surface 21 with the perimetral ring 22. The perimetral ring 22 has a projecting key 23 which orients the block insofar as the cylindrical axis is concerned when the lens is chucked for primary generation by the vacuum chuck 24 as shown in FIG. 5.

The shield plug 25 is inserted in the mold of the blocking machine before the thin lens block 2' is molded so that it will be accurately molded around the shield plug 25. A projection of the low melting-point material overlies the shield plug as indicated at 26 to aid in sealing and retaining the plug 25 in the window on the ocular vertex surface area of the lens.

The structure of FIGS. 4, 5, 6 and 7 is primarily used with plastic lenses. The block 2' is thin to provide quick dissipation of heat during the primary rough generation of the lens while it is being held in the vacuum chuck 24. The cavity between the smooth dome surface 21 of the block 2' and the inside surface 27 of the chuck 24 is sealed by the O-ring 32 and provided with a continuous vacuum supply source by way of the passage 28. Relief grooves 30 are provided on the smooth dome surface 21 to ensure uniform negative pressure throughout the cavity between surfaces 21 and 27. The stem 31 axially connected to the chuck 24 provides a means to support the chuck in the generating machine. The thinness of the block 2' and the constant removal of air through passage 28 ensures that the plastic lens will not be damaged by overheating.

When the lens has been roughly generated and is ready for fine cylindrical and spherical generation, the hard metal block 1' as shown in FIGS. 6 and 7, is seated over the low melting-point block 2' with a fairly precise fit. The aligned series of bearing recesses 12 and 13 are automatically positioned in line with the cylinder axis of the lens as the molded key 23, which has already been thus oriented before molding of the block 2' is received with precision by the key guide 29. Similarly, during rough generation of the lens, the lens is properly positioned by key 23 as shown in FIG. 5.

When the block 1' is seated on alloy block 2', the blocked lens may be seated in the vertometer mount with the proper alignment with respect to the cylinder axis as indicated by the guage surface 11 to check the lens against the prescription by viewing through the ocular vertex area exposed by the opening 15 after removal of plug 16'. If desired, the dome surface 21 and shoulder or ring surface 22 may be coated with an adhesive to ensure engagement of the block 1' on the low melting alloy block 2'.

The shield plug 16' has the extension 39 beyond surface 10 to provide a means of gripping and removing the plug.

Referring to FIGS. 8 and 9, the hard metal lens block 1" is identical to that shown in FIGS. 1 and 2 with the exception of the cylindrical collar 32 which has the frusto-conical annular surface 8 on the outside thereof and is slidably engaged with the cylindrical surface or shank portion 33. The surface 33 has an annular groove 34 therearound to receive the tip of the set screw 35 threadably engaged with and passing through the collar 32. Once the lens and block 1" have been oriented with respect to each other for axis and prism, the molten alloy 2 is poured and permitted to set and secure the block to the lens with the series of recesses 12 and 13 aligned with the prescription cylinder axis of the lens. Thereafter the blocked lens, including the collar 32 is mounted in a lensometer or vertometer with the flat gauge surface 111 held at a predetermined position. The lens is then rotated along with the main portion of the block 1" while the collar 32 remains stationary until the 180 degree horizontal layout line is found by viewing through the ocular vertex surface area window provided by the opening 15 after the shield plug 16' has been removed. The set screw 35 is then tightened to lock the collar 32 with the remainder of block 1" thereby fixing the plane of the gauge surface 111 parallel to or at least at a known reference angle from the original horizontal layout line. Thus on each future occasion for periodically checking the accuracy of the blocked lens with the prescription during generating and polishing operations, the lens will automatically be positioned properly in the vertometer mount upon insertion with respect to its horizontal layout line. In other words, the additional time required thereafter to orient the blocked lens in the vertometer to find the horizontal layout line is eliminated. This is not the case with the structure of FIG. 1 wherein the flat gauge surface 11 is fixed parallel to the line of the three recesses 12 and 13 or the axis of cylindrical generation to merely provide an accurate means of locating the lens axis. Thus when the blocked lens of FIG. 1 is mounted in the vertometer, it must always be turned to locate the 180 degree or horizontal layout line unlike the blocked lens of FIG. 8. Even though the original horizontal layout line which is inked on the surface of the lens to be ground before blocking will be removed by the grinding operations, its location will always be known because of the gauge surface 111 without wasting further time to relocate it.

It is obvious that the reference means provided by the surfaces 11 and 111 may be of a different design. For example, V-shaped notches may be provided in the perimeter of the block to provide a reference in substitution of the flat edges 11 and 111.

I claim:

1. The method of generating a lens comprising the steps of applying a shield plug to the ocular vertex surface area on the lens opposite the surface to be generated, mounting the lens with a low melting point material flowed about the plug and mounted in turn by a hard metal block to support the lens while generating and having an opening therethrough to expose the plug, generating the lens surface opposite that of the shield plug, and removing the shield plug to check the ophthalmic properties of the lens before removing the blocking.

2. The method of generating a lens comprising the steps of applying a shield plug to the ocular vertex surface area on the lens opposite the surface to be generated, blocking the back surface of the lens by covering it with a low melting point block material and surrounding the shield plug to expose the latter, applying a hard metal block to the low melting point block to support the lens when generating and polishing, generating the lens surface opposite that of the shield plug, and removing the shield plug from the blocking to check the generation accuracy before removing the blocking.

3. The method of generating a lens comprising the steps of applying a shield plug to the ocular vertex surface area of the lens opposite the surface to be generated, applying with the shield plug a hard metal block having an opening therethrough exposing the plug, applying a low melting point material to the spaced surface between the lens and the hard metal block to attach the same and to surround the shield plug, generating the lens surface opposite that of the shield plug, and removing the shield plug to check the ocular surface before demounting the hard metal block.

4. The method of generating a semi-finished lens, comprising applying a shield plug to the ocular vertex surface area on the lens opposite the surface to be generated, mounting the lens on a block having an opening therethrough to expose the plug, generating the lens surface opposite that of the shield plug, removing the shield plug to expose the ocular vertex surface area of the lens through said opening in the block, measuring the lens power and prism through the exposed vertex surface area of the lens, reinserting the shield plug to plug said opening in the block to seal off one end thereof from the other, thereby to shield said vertex area of the lens, and regenerating the lens to remove any inaccuracies determined by the measuring steps before removing the lens from the block.

References Cited

UNITED STATES PATENTS 2,437,436   3/1948   Mullen _____ 51—284
2,859,568   11/1958  Dantzic _____ 51—216

HAROLD D. WHITEHEAD, *Primary Examiner.*

U.S Cl. X.R.

51—216